United States Patent
Zhou et al.

(10) Patent No.: US 9,967,306 B1
(45) Date of Patent: May 8, 2018

(54) PRIORITIZED TRANSMISSION OF REDUNDANCY DATA FOR PACKETIZED VOICE COMMUNICATION

(71) Applicant: Sprint Spectrum L.P., Overland Park, KS (US)

(72) Inventors: Yu Zhou, Herndon, VA (US); Luca Zappaterra, Eindhoven (NL); Muhammad A. Naim, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 36 days.

(21) Appl. No.: 15/259,812

(22) Filed: Sep. 8, 2016

(51) Int. Cl.
  *H04L 29/06* (2006.01)
(52) U.S. Cl.
  CPC ........ *H04L 65/607* (2013.01); *H04L 65/1069* (2013.01); *H04L 65/602* (2013.01)
(58) Field of Classification Search
  None
  See application file for complete search history.

(56) References Cited

U.S. PATENT DOCUMENTS

| | | | |
|---|---|---|---|
| 5,870,412 A * | 2/1999 | Schuster | H03M 13/2703 |
| | | | 714/752 |
| 6,145,109 A | 11/2000 | Schuster et al. | |
| 6,167,060 A * | 12/2000 | Vargo | H03M 13/03 |
| | | | 370/468 |
| 6,208,646 B1 * | 3/2001 | Sugawara | H04Q 11/0478 |
| | | | 370/390 |
| 6,434,606 B1 * | 8/2002 | Borella | H04J 3/0632 |
| | | | 709/214 |
| 6,456,860 B1 * | 9/2002 | Nakagaki | H04W 88/181 |
| | | | 370/474 |
| 6,928,289 B1 * | 8/2005 | Cho | H04W 60/00 |
| | | | 370/310.2 |
| 7,516,387 B2 * | 4/2009 | Arnold | H03M 13/2703 |
| | | | 714/751 |

(Continued)

OTHER PUBLICATIONS

Jeremie Lecomte, et al., "Improved Error Resilience for Volte and VOIP With 3GPP EVS Channel Aware Coding," ResearchGate, Conference Paper—Apr. 2015.

(Continued)

*Primary Examiner* — Ayaz R Sheikh
*Assistant Examiner* — Tarell A Hampton

(57) ABSTRACT

A method for prioritized transmission of redundancy data in a voice-over-packet call. A sending device applies a variable rate codec to generate a sequence of encoded voice frames having varying sizes, and the sending device inserts the encoded voice frames into a sequence of fixed-size packets, one encoded voice frame per packet, resulting in varying left-over payload capacity per packet. The sending device further generates based on each encoded voice frame multiple redundancy blocks to help facilitate recovery of the encoded voice frame. And on a per packet-basis, the sending device selects, from a sliding-window set of recently generated redundancy blocks, one or more redundancy blocks to add into the left-over payload capacity of the packet, with the selecting of each redundancy block being based at least on importance of the voice frame based on which the redundancy block was generated, and the age and size of the redundancy block.

16 Claims, 5 Drawing Sheets

(56) References Cited

U.S. PATENT DOCUMENTS

| | | | |
|---|---|---|---|
| 7,930,617 B1* | 4/2011 | Gass | H03M 13/1515 714/756 |
| 9,680,507 B2* | 6/2017 | Subasingha | H03M 13/353 |
| 2003/0099240 A1* | 5/2003 | Lee | H04J 3/247 370/395.1 |
| 2006/0195576 A1* | 8/2006 | Rinne | H04L 47/822 709/226 |
| 2006/0291475 A1* | 12/2006 | Cohen | H04L 1/0041 370/395.42 |
| 2008/0288986 A1* | 11/2008 | Foster | G08B 13/19656 725/62 |
| 2008/0304520 A1* | 12/2008 | Hannuksela | H04L 1/0057 370/498 |
| 2009/0103635 A1* | 4/2009 | Pahalawatta | H04L 1/007 375/240.27 |
| 2009/0135774 A1* | 5/2009 | Kang | H04L 1/0067 370/329 |
| 2009/0154495 A1* | 6/2009 | Ojala | H04L 1/0061 370/469 |
| 2009/0204722 A1* | 8/2009 | Ehlers | H04L 12/4633 709/236 |
| 2009/0262838 A1* | 10/2009 | Gholmieh | H04L 1/007 375/240.27 |
| 2011/0060974 A1* | 3/2011 | Viger | H04L 1/0041 714/800 |
| 2011/0164574 A1* | 7/2011 | Rao | H04L 1/0007 370/329 |
| 2013/0019136 A1* | 1/2013 | Vafin | H04L 1/0009 714/751 |
| 2013/0039410 A1* | 2/2013 | Tan | H03M 13/05 375/240.02 |
| 2013/0339824 A1* | 12/2013 | Vafin | H03M 13/05 714/776 |
| 2014/0047303 A1* | 2/2014 | Vafin | H03M 13/05 714/776 |
| 2016/0036564 A1* | 2/2016 | Krishnan | H04L 1/008 714/748 |
| 2016/0308791 A1* | 10/2016 | Subasingha | H04J 3/0632 |
| 2017/0125028 A1* | 5/2017 | Sinder | G10L 19/167 |
| 2017/0125029 A1* | 5/2017 | Atti | G10L 19/167 |
| 2017/0169833 A1* | 6/2017 | Lecomte | G10L 19/20 |

OTHER PUBLICATIONS

Silvano Martello, et al., "Dynamic Programming and Strong Bounds for the 0-1 Knapsack Problem," Management Science/vol. 45, No. 3, Mar. 1999.

Nokia, "The 3GPP Enhanced Voice Services (EVS) codec," Nokia Networks white paper, printed from the World Wide Web on Jul. 11, 2016.

Wikipedia, "Knapsack problem," https://en.wikipedia.org/wiki/Knapsack_problem, printed from the World Wide Web on Jan. 11, 2016.

* cited by examiner

PRIORITIZED TRANSMISSION OF REDUNDANCY DATA FOR PACKETIZED VOICE COMMUNICATION

BACKGROUND

To facilitate communication of voice over a packet switched network between two devices, the devices (by themselves, or cooperatively with the assistance of serving nodes or intermediaries) typically make use of an agreed voice codec that allows efficient transmission of voice in a digital form. Considering a voice call between two users each operating a respective device, for example, the sending device may receive voice from a user, sample and digitize the voice to produce a representative digital bit stream defining frames of voice data, typically 20 milliseconds each, apply a voice codec to the bit stream to produce an encoded bit stream, and packetize the encoded bit stream and transmit the resulting packets via the packet switched network to the receiving device. The receiving device may then receive the packets, re-order them if necessary, extract the encoded bit stream, apply the voice codec to decode the encoded bit stream so as to uncover the digital bit stream, and convert the digital bit stream to analog form for playout to a user.

Voice codecs may be fixed rate or variable rate. A fixed rate voice codec represents each voice frame by a fixed number of bits. Whereas, a variable rate codec may have a range of encoding rates for representing voice frames with a varying number of bits. Examples of variable rate voice codecs include, without limitation, Adaptive-Multi-Rate Narrowband (AMR-NB), Adaptive-Multi-Rate Wideband (AMR-WB), and Enhanced Voice Services (EVS).

When using a variable rate codec, a device engaged in a voice communication may determine that the voice codec rate should be changed to a particular rate based on various factors. In a wireless communication system, for instance, the voice codec rate used by a device could be set dynamically based on the strength or quality of the device's air interface communication with its serving base station. For example, if the device is in weak coverage of the base station, the device could use a lower voice codec rate to help increase the chances of successful communication over the weak air interface. Whereas, if the device is in strong coverage of the base station, the device could use a higher voice codec rate to help improve quality of the voice communication.

Further, at times during a voice call when a user of the sending device is not talking, the sending device may generate data representing background comfort noise (e.g., subtle white noise) for playout by the receiving device. Thus, certain voice frames transmitted from the sending device to the receiving device may be such comfort noise data rather than actual voice data, and the comfort noise data could be similarly encoded with a fixed rate or variable rate codec. Further, other types of voice frame data might be transmitted in certain implementations.

OVERVIEW

With a representative variable rate codec, the packets transmitted from the sender to the receiver are of a fixed size, having the same payload capacity as each other, and each packet carries an encoded voice frame. Due to the variability of the coding rate, the portion of the fixed-size payload capacity used for holding the voice frame may thus vary from packet to packet, and consequently the packets may have varying amounts of left-over payload space. One way to make use of this left-over payload space is to generate partial redundancy data from each voice frame and transmit the redundancy data within the left-over payload space of a subsequent packet. With this arrangement, if a packet is lost during transmission, the receiver could use the associated partial redundancy data to help recover the lost voice frame.

FIG. 1 depicts this arrangement by way of example. As shown in FIG. 1, a speaker's device uses a variable rate codec to generate encoded voice frames N, N+1, . . . N+4. Further, for each voice frame, the speaker's device generates redundancy data and concatenates the redundancy data with the encoded voice frame K=2 packets later. The listener's device may then use the redundancy data carried in a given packet to help recover lost voice frame data from K=2 packets earlier.

In an example implementation of this process, when the speaker's device is going to transmit a next voice frame during a call, the device encodes the voice frame at a desired rate and thus produces the encoded (primary) voice frame that would consume a certain portion of the fixed-size payload capacity of a packet. Considering the resulting size of the left-over payload space in the packet, the device may then compute redundancy data based on the voice frame that it transmitted two packets earlier, such that the redundancy data fills the left-over space. The device may then concatenate or otherwise combine the redundancy data with primary voice frame within the payload space of the packet and transmit the packet to the listener's device. The listener's device may then make use of the redundancy data to the extent helpful to recover data lost in transit. For instance, if the packet carrying encoded voice frame N is lost as shown in FIG. 1, the listener's device may make use of the redundancy data carried two packets later (concatenated or otherwise combined with the encoded voice frame N+2) to help recover lost voice frame N.

Disclosed herein is an improvement of this process, to provide prioritized transmission of redundancy data. In accordance with the disclosure, a sending device will generate two or more blocks of redundancy data based on each voice frame, with the redundancy blocks being the same size as each other or different sizes than each other. Further, the sending device will store a set of the redundancy blocks that it generates for every M consecutive voice frames, over a sliding window, where M could be 6 or another designated number depending on the maximum tolerable voice end-to-end latency.

When the sending device then generates a new encoded voice frame for transmission in a packet, the sending device will determine how much left-over payload capacity will remain in the packet beyond the encoded voice frame (e.g., including any overhead information). And the sending device will evaluate the current set of redundancy blocks to select one or more redundancy blocks to insert into that left-over space. In particular, the sending device will determine an importance score per redundancy block, based on considerations such as (i) age of the redundancy block and (ii) importance of the primary voice frame associated with the redundancy block, such as whether the primary voice frame is for actual voice or rather merely for comfort noise of the like. The sending device will then apply a known mathematical process (e.g., the knapsack problem) to select from the set of redundancy blocks one or more redundancy blocks to add to the left-over payload space of the current packet, based on (i) the determined importance score per redundancy block and (ii) the size per redundancy block. And the sending device will then concatenate or otherwise combine the selected redundancy block(s) with the primary voice frame data in the payload space of the current packet. Optimally, this process may thus work to maximize filling of the available payload capacity in the fixed-size packets while also accounting for the relative importance of the redundancy blocks.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 2:
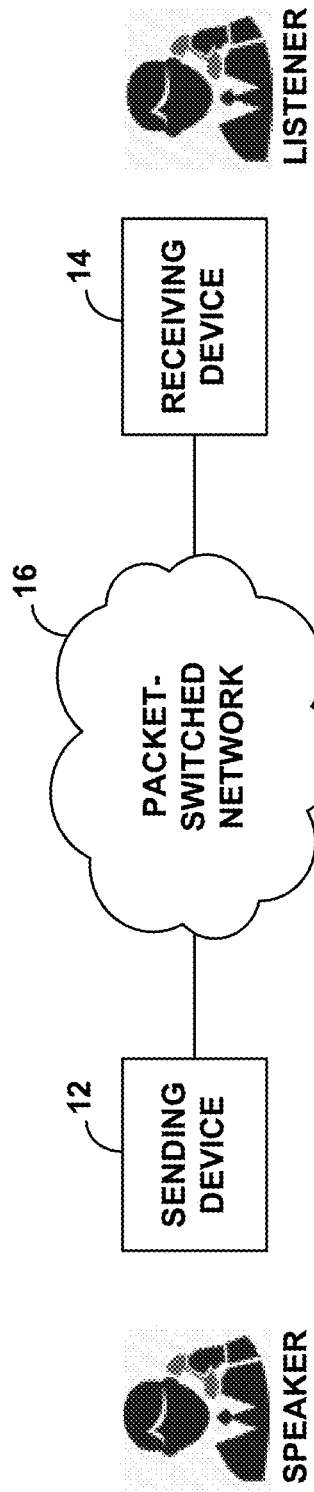
FIG. 2 is a simplified block diagram of a communication system in which features of present disclosure can be implemented.

FIG. 2 is a simplified block diagram of a communication system in which features of the present disclosure can be implemented. As shown, the system includes a sending device 12 operated by a user designated as a speaker, and a receiving device 14 operated by a user designated as a listener. The sending device and receiving device are then each communicatively linked with a packet-switched network 16, to facilitate communication between the devices.

In practice, the sending device and receiving device can take any of a variety of forms, optimally configured to interface with users to facilitate voice call communication, and can differ in form from each other. And likewise, the communication links between the sending device and the packet-switched network and between the receiving device and the packet-switched network can take any of a variety of forms, including wired and/or wireless links and any of a variety of intervening networks and nodes, and the links can vary in form from each other.

In an example implementation, the sending device and receiving device may be cellular telephones and may each be served by a respective (or common) cellular access network that provides connectivity with the packet-switched network. As such, the sending device and receiving device may each be served by a respective (or common) base station over an air interface, according to an agreed air interface protocol, examples of which include Long Term Evolution (LTE), Code Division Multiple Access (CDMA), and Global System for Mobile Communication (GSM), and the base station may be coupled with network infrastructure, including gateways or the like, that provides connectivity with the packet-switched network. Through this example arrangement, the sending and receiving device may each acquire wireless packet-network connectivity including an Internet Protocol (IP) address usable to engage in communication on the packet-switched network via their serving access network.

In this arrangement, the sending and receiving devices may each further communicate via their access networks and perhaps via the packet-switched network with an Internet Multimedia Subsystem (IMS), which may facilitate voice over IP (VoIP) call communication between the devices. In practice, for instance, the devices may engage in Session Initiation Protocol (SIP) signaling with the IMS (or with respective IMSs, which may in turn communicate with each other) to set up a VoIP call with each device having a call leg with the IMS and the IMS bridging the call legs together. Further, during this setup process, the devices may agree with each other to make use of a particular variable rate codec, such as EVS with Channel Aware Mode (CAM) for instance. Alternatively, the devices could engage in more direct VoIP setup and call communication with each other with or without use of an IMS.

Further alternatively, although the sending device and receiving device will likely be client devices operated by end-users, an implementation of the present disclosure could involve the sending device and/or receiving device instead being a network node that provides for VoIP communication. For example, in another implementation, the user's client device could engage in circuit-based voice communication and signaling with a serving access network, and a node in the access network could operate as a gateway to convert between circuit-based voice communication and signaling with the user's client device and packet-based voice communication and signaling with an IMS, with the other device's access network, or directly with the other device. Other arrangements are possible as well.

In example operation, as discussed above, the sending device receives voice from the speaker, digitizes the voice to produce a digitized voice bit stream defining a sequence of 20-millisecond voice frames, and encodes each voice frame using a variable rate codec, such as EVS with CAM, to produce an encoded bit stream. Further, in instances where the speaker is not talking, the sending device may generate voice frames that partially or fully represent or indicate comfort noise, and the sending device may thus include such comfort noise voice frame data in the digitized voice bit stream or directly in the encoded bit stream. Consequently, certain voice frames may represent actual voice (e.g., spoken by a person), and other voice frames may represent comfort noise or the like.

In addition, the sending device may assign to each voice frame a frame identification number, which could indicate where the primary voice frame falls within the sequence of voice frames, to enable the receiving device to re-order the voice frames if necessary. Further, with the variable rate codec, the sending device may use a desired codec rate to encode each voice frame. And the sending device may send each encoded voice frame at a particular time. In practice, the sending device may thus include as part of the primary frame a primary voice frame header that specifies the primary frame identification number, the applied codec rate, a timestamp, and/or other such data. Alternatively, some or all of this information could be provided in another manner.

For every voice frame, the sending device then generates a new packet, having a packet header section that holds source and destination addresses, codec information, and the like, and having a packet payload section that holds a latest variable-rate encoded voice frame. These packets are optimally fixed size, in that the packets are all the same bit-length as each other or at least have the same payload bit-capacity as each other. Thus, as discussed above, with the variable encoding rate, the amount of left-over payload space may vary from packet to packet.

In accordance with the present disclosure as noted above, as the sending device establishes each encoded voice frame for inclusion in a packet, the sending device will also generate two or more redundancy blocks for that voice frame, to help enable recovery of the voice frame in the event of packet loss or the like. Optimally, the redundancy-generation process could result in redundant blocks that overlap with each other to some extent, to facilitate recovery of a lost primary frame even if one (or less than all) of the multiple associated redundancy blocks are also lost.

Any of a variety of methods can be applied to generate this redundancy data. As one example, the sending device could cyclically shift the encoded voice frame a certain number of times to generate a certain number of partial redundancy blocks based on the primary encoded voice frame, with the size of the redundancy blocks possibly varying over time. For instance, if the encoded voice frame is expressed in hexadecimal as 1A2B3C4D5E, the sending device could establish overlapping subsets of hexadecimal digits, such as 1A2B, 2B3C, 3C4D, 4D5E, and 5E1A. Optimally with this arrangement, if the primary frame and one of these redundancy blocks are both lost in transmission, the receiving device could still recover the primary frame. Further, if the primary frame and any two of the redundancy blocks are lost, the receiving device may have a 50% chance of recovering the primary frame.

As another example, the sending device could apply frame fragmentation with Reed-Solomon coding. For instance, considering the example primary frame noted above, the sending device could divide the primary frame into fragments 1A, 2B, 3C, 4D, and 5E, and could create redundancy blocks from these fragments by using Reed-Solomon coding. As is well known, Reed-Solomon coding can allow for correcting up to t symbols that contain errors in an n symbol codeword with k symbols of data, where 2t=n−k. By way of example, assuming each symbol is 8 bits and the fragments are those noted above, Reed-Solomon coding of the five fragments to produce two redundancy blocks could enable recovery of up to one lost fragment, or Reed-Solomon coding of the five fragments to produce four redundancy blocks could enable recovery of up to two lost fragments.

Numerous other redundancy coding algorithms, including variations on those noted above and others now known or later developed could be used as well. Regardless of the algorithm used, the sending device may thus establish for each primary voice frame (whether containing actual voice data and/or comfort noise data or the like) two or more redundancy blocks, as parity information that can help facilitate recovery of part or all of the primary frame in the event of loss of the primary frame during transit or the like.

In practice, as further noted above, the sending device will maintain in data storage the redundancy blocks that the sending device has established for each of the last M primary voice frames of the voice call on a sliding window basis, and the sending device will dynamically select and insert into the payload space of subsequent packets certain ones of the redundancy blocks from those stored, in a manner that helps maximize the left-over payload space in each packet and that accounts for the relative priority of the redundancy blocks. Given latency limitations for voice communication, the sending device could set the value of M to be a value that helps prevent stale transmission of redundancy information. For instance, accounting for other contributors to the end-to-end latency between participants in a VoIP call, the sending device could set the value of M to be 6, so that the sending device would derive and maintain in data storage redundancy blocks for the most recent 6 primary voice frames, on a sliding window basis, and the sending device will endeavor to transmit redundancy blocks derived from a given primary voice frame by 6 packets later at the latest. Other values of M could be used as well.

In practice, each redundancy block that the sending device inserts in a packet could itself have an added header portion that specifies certain associated attributes to help facilitate primary voice frame recovery by the receiving device when necessary. By way of example, for each of the multiple redundancy blocks that the sending device derives from a given primary voice frame, the sending device could assign and add as a header parameter a redundancy block identification number, such as a sequence number, which could indicate which of the multiple redundancy blocks derived from the primary voice frame the redundancy block is, if relevant to facilitate primary voice frame recovery. As another example, for each redundancy block, the sending device could add as a header parameter the identification number of the primary voice frame from which the redundancy block was derived, to enable the receiving device to use the redundancy block for recovery of that primary voice frame if necessary. Other examples are possible as well.

The sending device may store each redundancy block in data storage with its added header or in a database association with the various header parameters so that sending device can add the header parameters when inserting the redundancy block into a subsequent packet.

Further, the sending device may also store in association with each redundancy block various other attribute data that can help the sending device later determine which redundancy block(s) to select for insertion into the left-over space of a given subsequent packet. By way of example, for each redundancy block, the sending device could store a total bit-size of the redundancy block and its associated header data, to help facilitate selecting suitably sized redundancy blocks (including their headers) for insertion into the left-over space of subsequent packets. As another example, in association with each redundancy block, the sending device could store a timestamp or packet counter of the associated primary voice frame, which the sending device could later use as a basis to gauge how long ago the associated primary voice frame was transmitted and thus how old the redundancy block is.

As still another example, for each redundancy block, the sending device could establish and store an associated redundancy block a redundancy block priority level (relative to other redundancy blocks). The sending device could establish the redundancy block priority level for a redundancy block based on various factors related to the associated primary frame and/or the redundancy block itself, with the factors possibly functioning as weights or scaling factors to render the priority level higher or lower.

For instance, the sending device could establish the redundancy block priority level based on the importance of the associated primary voice frame (in relation to other primary voice frames), such as with the redundancy block priority level being higher if the voice frame represents actual voice and lower if the voice frame that represents mere comfort noise or the like rather than actual voice. Further, the sending device could establish the redundancy block priority level based on how much the redundancy block can contribute to recovery of the primary frame, such as with the redundancy block priority level being higher if the redundancy block can contribute more to recovery of the primary frame and lower if the redundancy block can contribute less to recovery of the primary frame. (As an example of this, if the redundancy block is larger than other redundancy blocks and/or otherwise contains more redundancy information and can thus better help recover the underlying primary voice frame, the redundancy block could be assigned a relatively higher priority level, and vice versa.)

In accordance with the present disclosure, when the sending device generates a new encoded voice frame using the variable rate codec, the sending device could determine how much left-over payload space there will be in a fixed-size packet that will carry the encoded voice frame. At issue for the sending device is then which of its currently stored set of stored redundancy blocks the sending device should select to be inserted into that left-over space.

To address this issue, the sending device could evaluate its current set of stored redundancy blocks to determine respective for each stored redundancy block an associated redundancy block importance score, where the determined redundancy block importance score is based on the indicated redundancy block priority level of the redundancy block and on the indicated age of the redundancy block in relation to transmission of its associated primary voice frame. In practice, the sending device could treat the redundancy block priority level and redundancy block age as weights or scaling factors to render the importance score higher or lower. For example, a higher redundancy block priority level could render the importance score higher, and a lower redundancy block priority level could render the importance score lower. And a higher redundancy block age could render the importance score higher, and a lower redundancy block age could render the importance score lower.

The sending device could then apply a known mathematical process known as a "the knapsack problem" to select one or more of the stored redundancy blocks to insert into the determined left-over payload space of the current packet, based on (i) the determined redundancy block importance score per redundancy block, (ii) the redundancy block size per redundancy block, and (iii) the left-over payload capacity of the current packet. Those of ordinary skill in the art are familiar with the knapsack problem and could apply it in this context, in an effort to achieve the goal of maximizing the amount of the left-over payload space in the packet while also maximizing the sum total importance scores of the one or more redundancy blocks thereby selected for insertion into the packet.

The sending device could then insert the selected one or more redundancy blocks into the payload section of the current packet, concatenating or otherwise combining the selected redundancy block(s) with the encoded primary voice frame in the packet for transmission of the resulting packet to the receiving device. Further, the sending device could remove the selected redundancy blocks from the set of those stored and could derive and add to the set two or more redundancy blocks based on the primary voice frame of the current packet. The process would then continue iteratively with respect to the next voice frame of the call.

Figure 1:
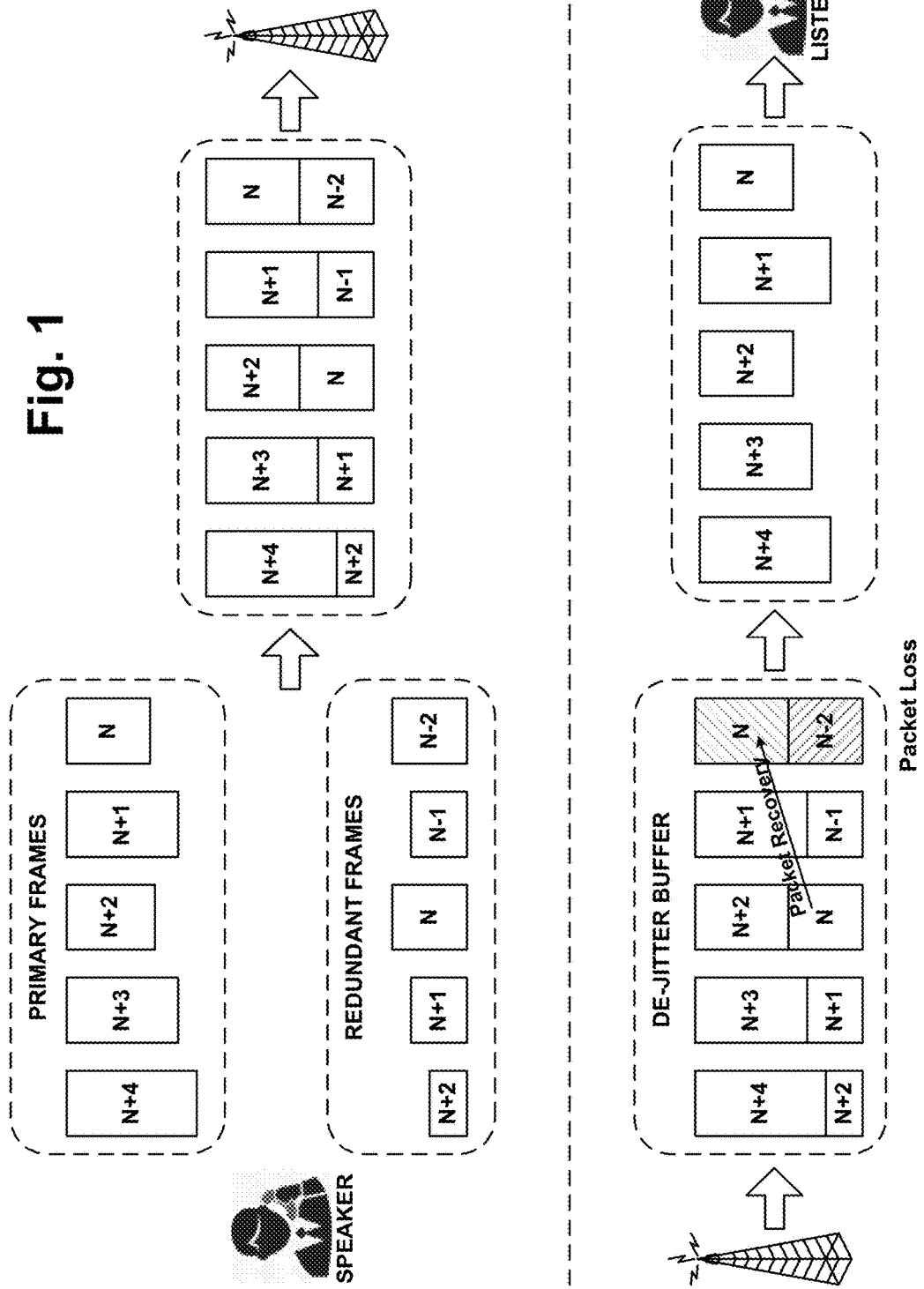
FIG. 1 illustrates a process of transmitting redundancy data along with primary voice frame data.
Figure 3:
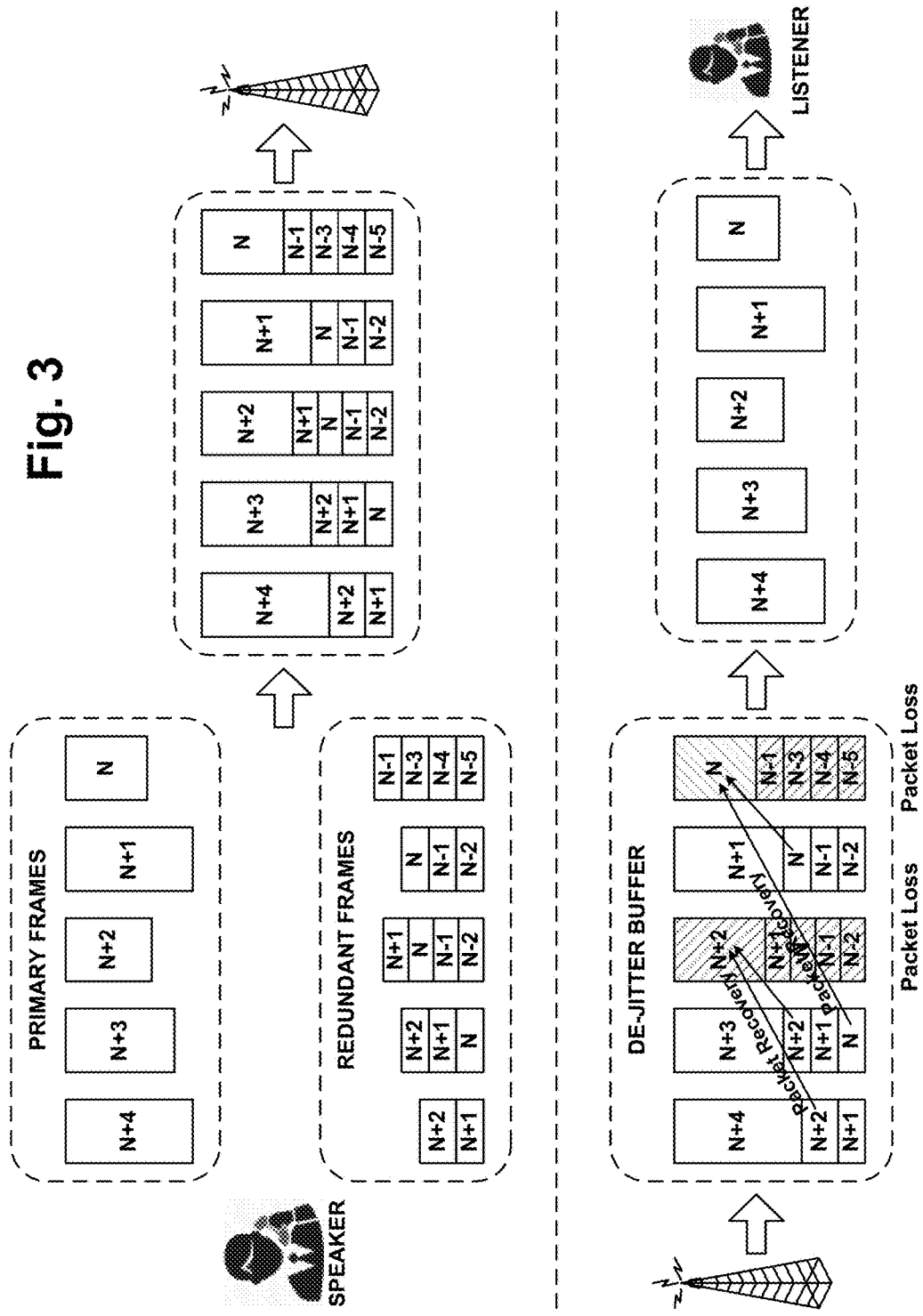
FIG. 3 illustrates a process of prioritized transmission of redundancy blocks in accordance with the present disclosure.

FIG. 3 depicts how this may play out in practice, to help efficiently fill the left-over payload space of packets being transmitted from the sending device to the receiving device. As shown in FIG. 3, as in FIG. 1, a speaker's device uses a variable rate codec to generate encoded voice frames N, N+1, . . . N+4. Here, for each voice frame, the speaker's device applies the process described above to generate two or more redundancy blocks (possibly the same quantity and size of redundancy blocks per voice frame, or possibly with the quantity varying per voice frame and the sizes varying per voice frame and/or among those derived from a given voice frame), and the speaker's device stores the redundancy blocks associated with a number of voice frames on a sliding window basis.

Applying the process described above, for each packet, the sending device then dynamically selects redundancy blocks to insert into the left-over payload space of the packet and inserts the selected redundancy blocks accordingly. Thus, as shown by way of example, the sending device may derive three redundancy blocks (each labeled N) from voice frame N and may end up dynamically distributing those redundancy blocks among the packets carrying voice frames N+1, N+2, and N+3. (Although the figure shows the distribution of the redundancy blocks being in each of the next three packets, this could be happenstance, as the sending device goes through the dynamic process discussed above. It is just as well possible that the redundancy blocks from voice frame N could end up being inserted into the packets carrying voice frames N+1, N+3, and N+4, and/or that multiple redundancy blocks from voice frame N could end up being inserted into the same packet as each other.)

As then further shown in FIG. 3, with the example illustrated, if the packet carrying voice frame N is lost in transit, the receiving device could possibly recover voice frame N based on the associated redundancy blocks carried by the packets carrying voice frame N+1 and N+3. Further, if the packet carrying voice frame N+2 is lost, the receiving device could possibly recover voice frame N+2 based on the associated redundancy blocks carried by the packets carrying voice frames N+3 and N+4. Numerous other examples are possible as well.

Figure 4:
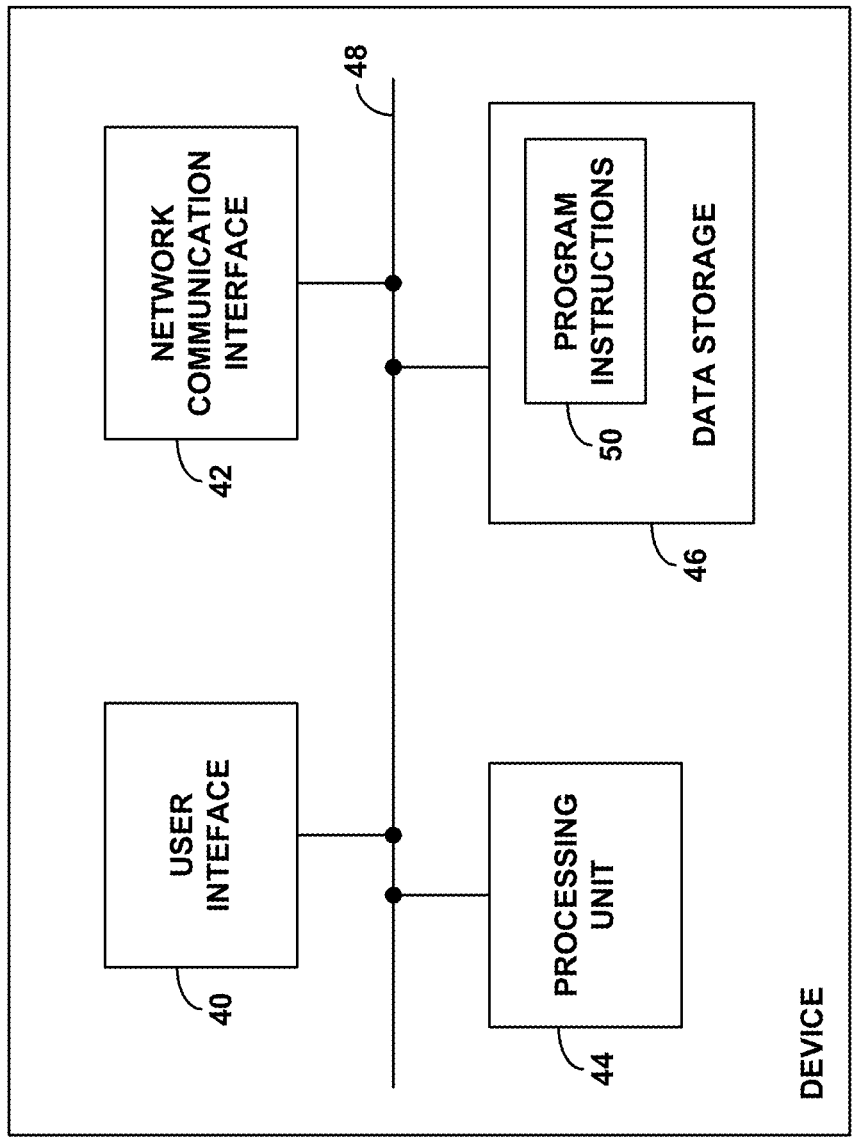
FIG. 4 is a simplified block diagram of a communication device operable in accordance with the disclosure.

FIG. 4 is next a simplified block diagram of a device that could operate in accordance with this disclosure, as the sending device or as the receiving device. As shown in FIG. 4, the device includes a user interface 40, a network interface 42, a processing unit 44, and data storage 46, all of which could be communicatively linked together by a system bus or other connection mechanism 48 and/or could be integrated together in whole or in part.

The user interface 40 could include voice input and output components such as a microphone and a sound speaker, as well as analog-digital conversion circuitry. The network interface 42 could comprise a wireless and/or wired interface, such as a transceiver and antenna structure for engaging in communication with a serving cellular wireless network and/or a wired Ethernet port for coupling with a wired local area network or the like. The processing unit 44 could comprise one or more general purpose processors (e.g., microprocessors) and or one or more specialized processors (e.g., digital signal processors, application specific integrated circuits, etc.). And the data storage 46 could comprise one or more volatile and/or non-volatile non-transitory storage components, such as magnetic, optical, and/or flash storage. As shown, the data storage could then hold program instructions 50, which could be executable by the processing unit 44 to carry out various operations described herein.

Figure 5:
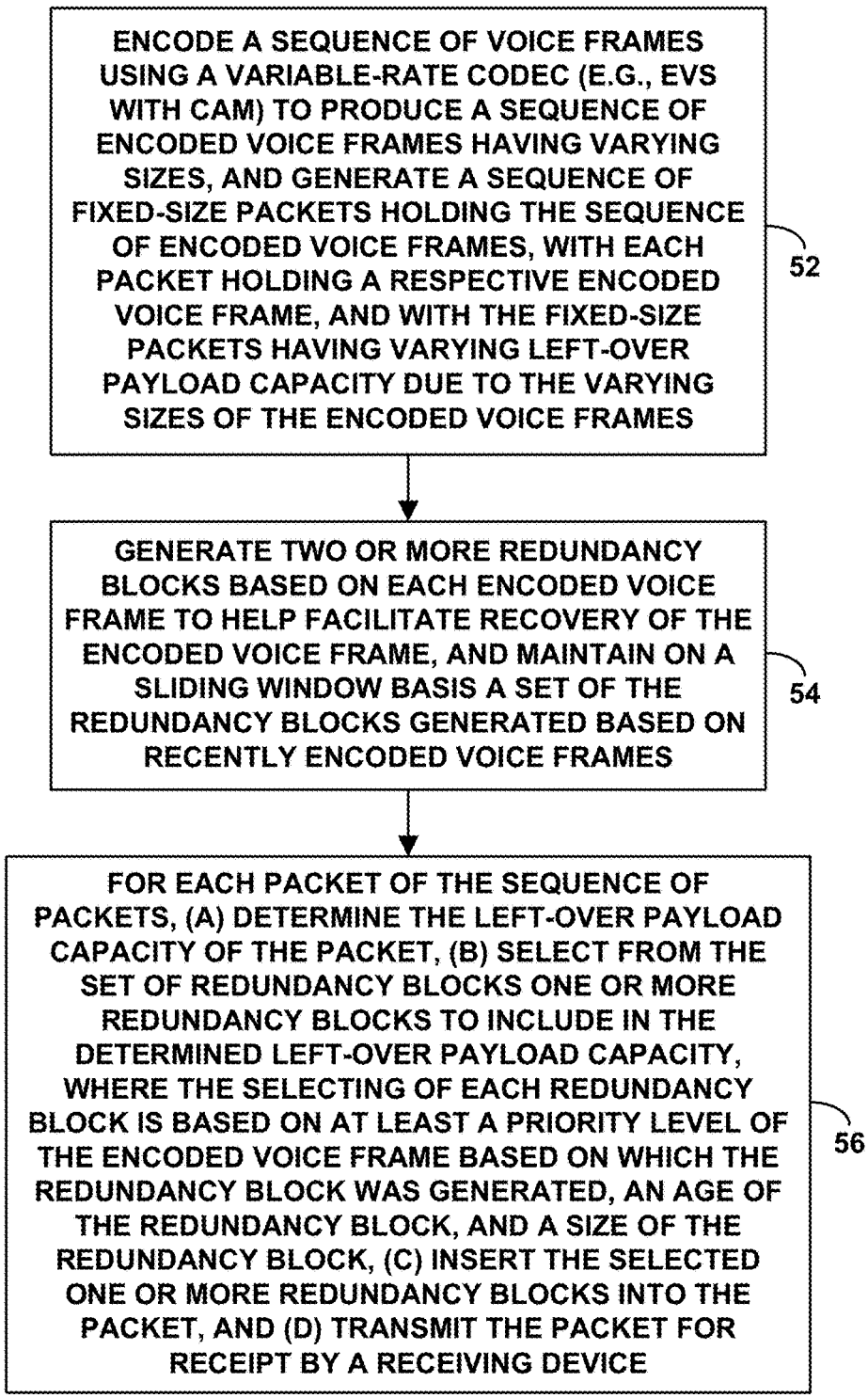
FIG. 5 is a flow chart depicting operations that can be carried out in accordance with the disclosure.

FIG. 5 is a flow chart depicting a method that can be carried out by a sending device in accordance with this disclosure, to facilitate prioritized transmission of redundancy data in a voice-over packet call. Although the blocks of this method are shown in sequence, they may be carried out in parallel or in another manner.

As shown in FIG. 5, at block 52, the method includes the sending device encoding a sequence of voice frames using a variable-rate codec (e.g., EVS with CAM) to produce a sequence of encoded voice frames having varying sizes, and the sending device generating a sequence of fixed-size packets holding the sequence of encoded voice frames, with each packet holding a respective encoded voice frame, and with the fixed-size packets having varying left-over payload capacity due to the varying sizes of the encoded voice frames. At block 54, the method includes the sending device generating two or more redundancy blocks based on each encoded voice frame to help facilitate recovery of the encoded voice frame, and the sending device maintaining on a sliding window basis a set of the redundancy blocks generated based on recently encoded voice frames (namely, maintaining as the set those recent redundancy blocks not yet transmitted). At block 56, the method includes, for each packet of the sequence of packets, the sending device (a) determining the left-over payload capacity of the packet, (b) selecting from the set of redundancy blocks one or more redundancy blocks to include in the determined left-over payload capacity, wherein the selecting of each redundancy block is based on at least a priority level of the encoded voice frame based on which the redundancy block was generated, an age of the redundancy block, and a size of the redundancy block, (c) inserting the selected one or more redundancy blocks into the packet, and (d) transmitting the packet for receipt by a receiving device.

In line with the discussion above, the priority level of each encoded voice frame could be based on whether the encoded voice frame represents actual voice. In particular, some of the encoded voice frames could represent actual voice, and others of the encoded voice frames represent comfort noise rather than actual voice, and the encoded voice frames that represent actual voice could have higher priority levels than the encoded voice frames that represent comfort noise. The sending device could thus determine the priority level of each voice frame, to facilitate selecting a redundancy block based at least on the priority level of the encoded frame based on which the redundancy block was generated.

Still further, the method could include, for each packet of the sequence of packets, the sending device determining for each redundancy block of the set of redundancy blocks an age of the redundancy block, to facilitate selecting a redundancy block based at least on the age of the redundancy block. And the method could include, for each packet of the sequence, assigning by the sending device to each redundancy block of the set of redundancy blocks a respective importance score based on (i) the priority level of the voice frame based on which the redundancy block was generated and (ii) a current age of the redundancy block, with the selecting then being based on the assigned importance scores. And as discussed above, the selecting of the one or more redundancy blocks for inclusion in each packet of the sequence could help to optimize filling of the determined left-over payload capacity of the packet.

Exemplary embodiments have been described above. Those skilled in the art will understand, however, that changes and modifications may be made to these embodiments without departing from the true scope and spirit of the invention.

We claim:

1. A method for prioritized transmission of redundancy data in a voice-over-packet call, the method comprising:
encoding by a sending device a sequence of voice frames using a variable-rate codec to produce a sequence of encoded voice frames having varying sizes, and generating by the sending device a sequence of fixed-size packets holding the sequence of encoded voice frames, wherein each packet holds a respective encoded voice frame, and wherein the fixed-size packets have varying left-over payload capacity due to the varying sizes of the encoded voice frames;

generating by the sending device two or more redundancy blocks based on each encoded voice frame to help facilitate recovery of the encoded voice frame, and maintaining by the sending device on a sliding window basis a set of the redundancy blocks generated based on recently encoded voice frames; and for each packet of the sequence of packets, (a) determining by the sending device the left-over payload capacity of the packet, (b) selecting from the set of redundancy blocks one or more redundancy blocks to include in the determined left-over payload capacity, wherein the selecting of each redundancy block is based on at least a priority level of the encoded voice frame based on which the redundancy block was generated, an age of the redundancy block, and a size of the redundancy block, (c) inserting the selected one or more redundancy blocks into the packet, and (d) transmitting the packet for receipt by a receiving device.

2. The method of claim 1, wherein the variable-rate codec is Enhanced Voice Codec with Channel Aware Mode.

3. The method of claim 1, wherein the priority level of each encoded voice frame is based on whether the encoded voice frame represents actual voice.

4. The method of claim 3, wherein some of the encoded voice frames represent actual voice and others of the encoded voice frames represent comfort noise rather than actual voice, and wherein the encoded voice frames that represent actual voice have higher priority levels than the encoded voice frames that represent comfort noise.

5. The method of claim 4, further comprising determining by the sending device the priority level of each voice frame, to facilitate selecting a redundancy block based at least on the priority level of the encoded frame based on which the redundancy block was generated.

6. The method of claim 1, further comprising, for each packet of the sequence of packets, determining by the sending device for each redundancy block of the set of redundancy blocks an age of the redundancy block, to facilitate selecting a redundancy block based at least on the age of the redundancy block.

7. The method of claim 1, further comprising, for each packet of the sequence, assigning by the sending device to each redundancy block of the set of redundancy blocks a respective importance score based on (i) the priority level of the voice frame based on which the redundancy block was generated and (ii) a current age of the redundancy block, wherein the selecting is based on the assigned importance scores.

8. The method of claim 1, wherein, for each packet of the sequence, the selecting of the one or more redundancy blocks helps to optimize filling of the determined left-over payload capacity of the packet.

9. A device configured to engage in prioritized transmission of redundancy data in a voice-over-packet call, the device comprising:
a network communication interface for transmitting data;
a processing unit;
non-transitory data storage; and
program instructions stored in the data storage and executable by the processing unit to cause the device to carry out operations comprising:
encoding a sequence of voice frames using a variable-rate codec to produce a sequence of encoded voice frames having varying sizes, and generating a sequence of fixed-size packets holding the sequence of encoded voice frames, wherein each packet holds a respective encoded voice frame, and wherein the fixed-size packets have varying left-over payload capacity due to the varying sizes of the encoded voice frames, generating two or more redundancy blocks based on each encoded voice frame to help facilitate recovery of the encoded voice frame, and maintaining on a sliding window basis a set of the redundancy blocks generated based on recently encoded voice frames, and for each packet of the sequence of packets, (a) determining the left-over payload capacity of the packet, (b) selecting from the set of redundancy blocks one or more redundancy blocks to include in the determined left-over payload capacity, wherein the selecting of each redundancy block is based on at least a priority level of the encoded voice frame based on which the redundancy block was generated, an age of the redundancy block, and a size of the redundancy block, (c) inserting the selected one or more redundancy blocks into the packet, and (d) transmitting the packet via the network communication interface for receipt by a receiving device.

10. The device of claim 9, wherein the variable-rate codec is Enhanced Voice Codec with Channel Aware Mode.

11. The device of claim 9, wherein the priority level of each encoded voice frame is based on whether the encoded voice frame represents actual voice.

12. The device of claim 11, wherein some of the encoded voice frames represent actual voice and others of the encoded voice frames represent comfort noise rather than actual voice, and wherein the encoded voice frames that represent actual voice have higher priority levels than the encoded voice frames that represent comfort noise.

13. The device of claim 12, wherein the operations further comprise determining the priority level of each voice frame, to facilitate selecting a redundancy block based at least on the priority level of the encoded frame based on which the redundancy block was generated.

14. The device of claim 9, wherein the operations further comprise, for each packet of the sequence of packets, determining by the sending device for each redundancy block of the set of redundancy blocks an age of the redundancy block, to facilitate selecting a redundancy block based at least on the age of the redundancy block.

15. The device of claim 9, wherein the operations further comprise, for each packet of the sequence, assigning by the sending device to each redundancy block of the set of redundancy blocks a respective importance score based on (i) the priority level of the voice frame based on which the redundancy block was generated and (ii) a current age of the redundancy block, wherein the selecting is based on the assigned importance scores.

16. The device of claim 9, wherein, for each packet of the sequence, the selecting of the one or more redundancy blocks helps to optimize filling of the determined left-over payload capacity of the packet.

\* \* \* \* \*